Patented June 18, 1935

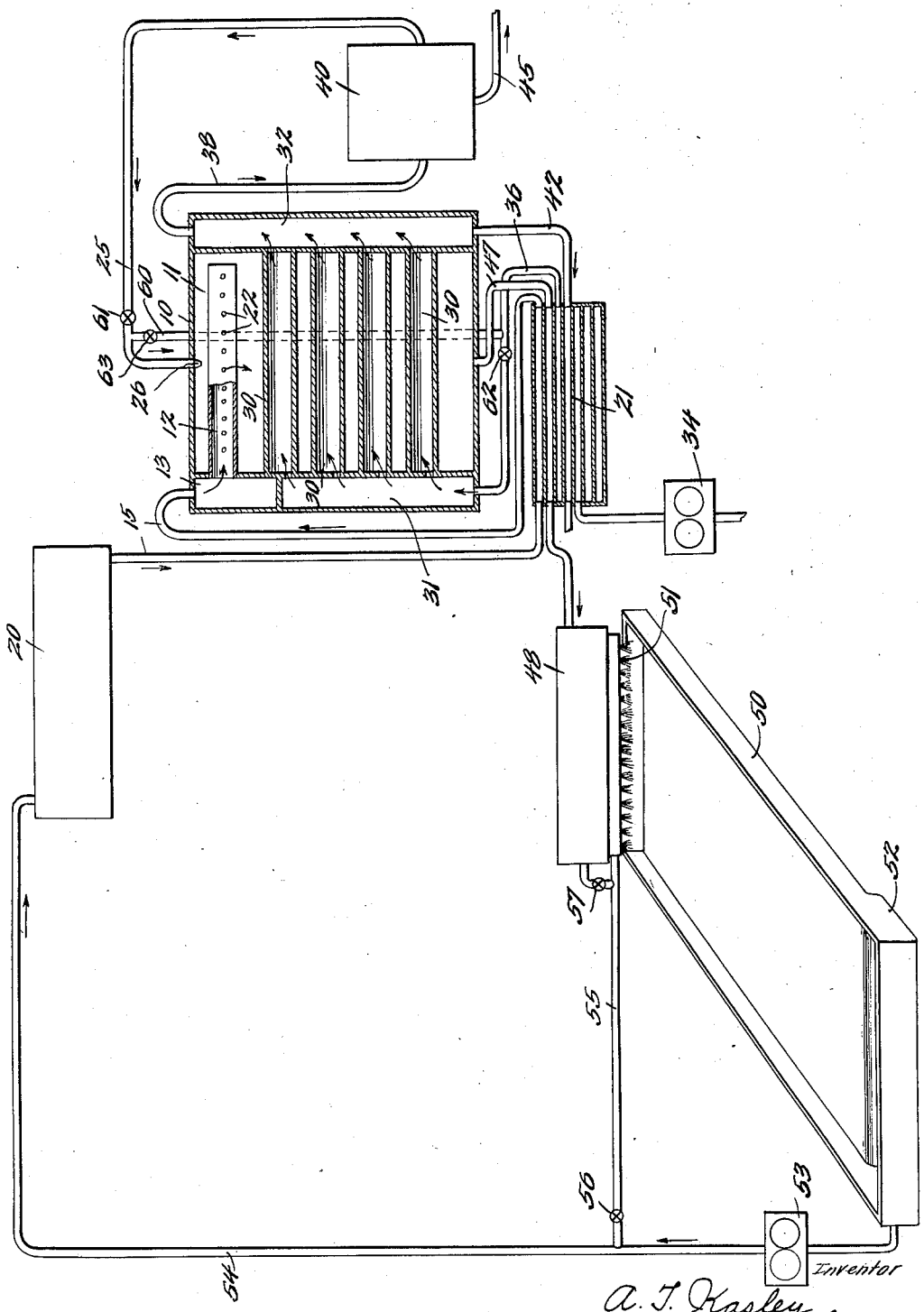

2,005,377

UNITED STATES PATENT OFFICE 2,005,377

POWER PLANT

Alexander T. Kasley, Prospect Park, Pa., assignor to Delaware Chemical Engineering Company, Wilmington, Del., a corporation of Delaware Application July 22, 1932, Serial No. 624,114
Renewed May 10, 1935

5 Claims. (Cl. 122—21)

This invention relates to power plants and more particularly to plants adapted for the production or generation of motive fluid, such as steam or the like, and which utilizes in the process the latent heat of an exhaust or waste fluid and the natural heat and evaporative capacity of the sun and of the atmosphere.

The general object of the invention is the provision of a novel and improved method and apparatus of this character which will attain the designated purpose.

It is a further object of my invention to utilize, in connection with such process and apparatus, a fluid having the property of absorbing water vapor, steam, or the like, such absorption being accompanied by the evolution of heat.

Still another object of the invention is to provide a method and means for regenerating this fluid, the absorptive capacity of which becomes exhausted upon dilution by the steam or water vapor.

In its preferred embodiment, the invention contemplates the provision of an apparatus combining the features of a steam boiler, hydrator, and evaporator in which the primary absorption fluid and the steam or water vapor are commingled and through which is conducted in a separated cycle a secondary fluid which is brought to a sufficient temperature by the heat developed in the absorption process to evolve high pressure motor fluid of suitable quality to operate a prime mover. The exhaust fluid from the prime mover provides the source of water vapor which is utilized in subsequent absorption by the primary fluid. The secondary fluid may alternatively be evaporated and subsequently treated for the purpose of purification or concentration instead of furnishing power.

The absorption fluid is preferably a concentrated solution of one or more salts such as, for example, calcium chloride or calcium nitrate. Sea water may be conveniently used as the secondary fluid which is to be evaporated, especially in localities near the ocean and in such districts where fresh water may be scarce. The vapor from this heated secondary fluid condensed in an evaporator may be used to replenish the fresh water supply and by the proper treatment may be rendered palatable for drinking purposes. The residues from the evaporation of the sea water may be made to yield large quantities of valuable by-products such as magnesium, potash, bromine, gold, and perhaps iodine and other substances. The return to be realized from the marketing of these recovered by-products will greatly reduce the operating charges of the plant, and, in fact, it is conceivable that this return might carry the whole overhead charge, which would mean that the available power generated, or the fresh water distilled from the sea water, could be distributed at a very low cost.

From the generating apparatus, to which reference has been made, the spent salt solution which has been diluted by the exhaust steam is drawn off and concentrated by subjection upon a preferably inclined open exposure field or bed of considerable area to the radiant heat of the sun and to contact with the atmosphere. The reconcentrated solution may then be stored for further use in the absorption process. It will be realized that preferably the alternate absorption and regeneration of the primary fluid is carried on continuously, enough of the concentrated solution being kept available to carry over any periods of any darkness or diminution in solar radiation. It has been found that in the case of a solution of 66 parts of anhydrous calcium chloride and 33 parts of anhydrous calcium nitrate in 76 parts of water, each 3½ cubic feet of solution contains 1 horsepower hour of available power.

Other objects and features of novelty will be apparent from the following specification when read in connection with the accompanying drawing, in which one embodiment of my invention is illustrated by way of example.

The figure in the drawing illustrates diagrammatically a power plant embodying the principles of my invention.

One of the chief features of the apparatus employed is the generating unit, designated generally by the numeral 10. As previously stated and as will become more apparent as the description proceeds, this unit combines the features of a steam boiler, a hydrator, and an evaporator. The unit 10 is provided with a chamber 11 which is traversed by a plurality of preferably tubular conduits which may be made of brass, the entire construction resembling somewhat that of a condenser. The upper row of tubes, designated by the numeral 12, is connected to a header 13 which is adapted to receive the concentrated primary fluid through piping 15 from a storage vessel 20 through the multiple counter-flow economizer 21, the operation of which will be later described, whereby the temperature of the solution is raised from about 100° F. to about 250° F. The upper row of distributing tubes 12, one of which is shown in the diagrammatic view, is provided with openings 22 through which the strong solution is adapted to flow. Exhaust steam from a suitable source such as the prime mover which is to be operated by the power plant is conducted through the pipes 25 to the nozzle 26 through which it is introduced into the chamber 11 at the upper portion thereof, preferably in the vicinity of the solution distributing pipes 12. In commingling with the exhaust steam, the concentrated primary fluid flows in a thin layer downwardly in the chamber 11, absorbing the steam during its flow and liberating both the latent heat of the steam and the heat of absorption.

A series of transverse tubes 30, which are illustrated in cross-section in the diagram, is arranged in the chamber 11 beneath the tubes 12 and is continuously enveloped by the falling hot primary fluid. These tubes 30 are connected to the inlet header 31 and to the outlet header 32 and are adapted to receive a secondary fluid which is vaporized to generate high pressure motive fluid in these conduits. The secondary fluid, which may be either fresh water or sea water, is passed by means of the pump 34 through the economizer 21 and thence by means of the pipe 36 to the inlet header 31. The steam generated in tubes or conduits 30 passes into the outlet header 32 and from there is transmitted by means of the pipes 38 to the prime mover 40. The condensed or unevaporated residue from the secondary fluid is drawn off from the header 32 through the pipe 42 either to be wasted or carried to a chemical plant where valuable by-products may be extracted. The pipe 42 is passed through the economizer 21 so that some of the heat remaining in the residues may be used to preheat the primary and secondary fluids.

In lieu of a prime mover, the apparatus designated 40 in the diagram may be a multi-stage evaporator, if it is the purpose to employ the plant to produce fresh water from sea water or the like, and in that case the fresh water obtained is drawn off through the pipe 45, and the steam produced in the last stage of the evaporators may be transmitted through the pipe 25 to the absorption chamber 11 as in the case of the exhaust steam from the prime mover.

The spent primary fluid, after it has accomplished its purpose in heating the generating tubes 30, flows through the conduit 47 to a storage container 48 traversing on the way the economizer 21, wherein it yields most of its remaining heat to the body of concentrated primary fluid on its way to the generating chamber and to the secondary fluid supplied by the pump 34.

The economizer is preferably constructed in the form of a series of concentric conduits, the innermost one of which is for the unevaporated residue from the pipe 42. The space between the inner conduit and the second conduit is for the secondary fluid supplied by means of the pump 34 through the pipe 36. The next annular space is for the flow of the hot spent primary fluid from pipe 47, and the outermost chamber is for the incoming strong primary solution from the tank or reservoir 20. The economizer and the connecting pipes may be lagged or insulated in any suitable manner.

For the purpose of reconcentrating and thereby regenerating the primary fluid, one or more exposure beds 50 are provided which are of considerable area and the surfaces of which are of some dark colored heat absorbing material. These surfaces are preferably exposed to the direct rays of the sun and are uncovered so as to provide free access to the atmosphere. The spent solution is sprayed as at 51 upon the exposure bed 50 and is allowed to flow in a thin sheet across the surface thereof which is inclined so as to accomplish this purpose.

One form of exposure bed which has proved satisfactory comprises a surface which is provided with corrugations which compel the fluid to spread over the entire area and is of sufficient inclination to cause the fluid to flow off into the collecting trough as indicated at 52 in the drawing. From trough 52 the fluid is normally taken by means of the pump 53 and transmitted through the conduits 54 to the concentrated solution storage tank 20. A by-pass conduit 55 may be inserted between the pipe 54 and the spraying device 51 so that, during a period of diminished solar radiation, some of the primary fluid can be returned to the exposure bed 50 until it reaches the desired strength. This by-pass may be controlled by the valve 56, and the valve 57 is used to restrict the flow from the spent solution tank 48 to the sprinkler or distributor 51. It will thus be seen that the primary fluid passes through a closed circuit and accomplishes a complete cycle in which it absorbs the exhaust steam with the generation of heat and in which it is in turn reconcentrated by the action of the atmosphere and of the solar radiation.

At this point it may be well to mention that, in starting the system, the strong solution and water are passed through the counterflow economizer, are mixed, and are then passed through the economizer in the opposite direction. Upon mixing, the temperature of the fluids is raised about 20° F., and this increase of heat is transmitted to the incoming fluids in the economizer so that their temperature is raised by about 18° F. Thus the temperatures of the fluids are gradually built up until steam is generated, whereupon the flow of preliminary mixing water is cut off, and the usual supply of steam is introduced to the chamber to be mixed with the strong solution.

Although any desired means may be provided to accomplish this preliminary generation of heat, a suggested arrangement is indicated diagrammatically in the drawing. A by-pass 60 is inserted between the secondary fluid feed line 36 and the steam conduit 25 and nozzle 26. In starting up, valve 61 controlling the steam line is closed, valve 62 controlling the flow of secondary fluid to the header 31 is also closed, and valve 63 disposed in the by-pass 60 is opened. This will permit the water employed as the secondary fluid, or water from an independent source, to flow in heat generating and heat exchanging relation with the strong solution until the temperatures rise sufficiently to produce steam, whereupon valve 63 is closed and valves 61 and 62 are opened, thus providing for normal operation.

It will be readily understood, furthermore, that the same sort of arrangement may be employed to keep the apparatus hot when no power is being taken from it, except that in this case the circulation must be accomplished at a slower rate than when starting the device from the cold condition.

For the purpose of more clearly explaining the invention, a concrete example of the operation of the apparatus and of the heat and power developed will be given. Let it be assumed that 325 pounds of concentrated solution are introduced into the mixing chamber for every 60 pounds of steam at 15 pounds absolute pressure and that the temperature of the strong solution is raised from 100° F. to 250° F. in the economizer. Then the heat developed in the strong solution by the economizer will be $150 \times 325 \times .58$ (specific heat) $= 28300$ B. t. u.

The heat developed in the generating chamber due to the latent heat of the steam and the heat of mixing the steam and primary fluid will be (970 (latent heat) $\times 60) + 5200$ (heat of mixture) $= 63400$ B. t. u.

If none of the heat generated were transmitted to the secondary fluid in the tubes 30, the temperature of the mixture would rise to about 506° F. However, the absorption of steam by the concentrated chemical solution cannot take place above 266° F. The mixture is cooled by the extraction of heat by the secondary fluid and the absorption process continues, the temperature of the mixture of the primary fluid and the steam remaining at about 257° F.

The amount of steam which will be evaporated by the 63400 B. t. u. is 67 pounds, and this amount of steam expanding from about 30 pounds to 15 pounds absolute pressures should produce about 1.1 H. P.

It has been determined that the amount of heat transmitted to the earth by the sun is 7.12 B. t. u. per minute per square foot of surface normal to the sun's rays. This value, of course, must be multiplied by the cosine of the latitude for places away from the equator and also is affected by the time of day in the case of a receiver which cannot be rotated to follow the apparent path of the sun and furthermore is affected by the amount of dust and vapor, etc., in the air. This figure indicates that there is ample heat available from this source to make a practical installation possible.

An evaporation test was recently made in the State of Delaware at about noon under the following conditions:

| | |
|---|---|
| Temp. in shade | 68° F. |
| Temp. wet bulb thermometer | 56° F. |
| Humidity | .65 |
| Temp. of test liquid in black tank in sun | 108.5° F. |

The sun was casting sharp shadows, and there was some haze in the sky. Under these conditions the amount of water evaporated per square foot of exposed solution per hour was .11 pounds. Assuming the water consumption rate of the normal turbine to be 60 pounds per brake horsepower hour, then the number of square feet of exposed surface necessary to evaporate enough water to provide 1 horsepower would be 60 times .11 or 540 square feet—this for the latitude and the climatic conditions in Delaware. It has been estimated that the number of square feet of evaporating surface per horsepower which would be required in California, where conditions are much more favorable, would be about 300. At a conservative estimate, conditions in California would be at least 63% better than at the location of the test.

The average evaporation per hour for the whole daylight period of approximately 12 hours is about two thirds of the rate at noon so that for a 24-hour period the evaporation per square foot would be .88 pounds. For the vicinity of Delaware this would mean that an area of 1000 square feet would yield about 14.67 H. P. hours $$\left(\frac{1000 \times .88}{60 \text{ (water rate of turbine)}} = 14.67\right)$$

or, for California, about 24 H. P. hours. This would be the equivalent of an evaporative power in a three-stage evaporator of 522 gallons of water, this figure being arrived at as follows:

$$\frac{8 \text{ (hrs.)} \times 1000 \text{ (sq. ft.)} \times .11 \text{ (lbs.)} \times 1.63 \text{ (factor)} \times 3 \text{ (stages)}}{8.33 \text{ (lbs. per gal.)}} = 522$$

It will be seen from the above figures that 1 acre of ground containing approximately 44,000 square feet would be capable of delivering a total of 1056 H. P. hours per day.

In many localities the only cost of constructing the exposure field would be that of laying the spraying pipes for the distribution of the spent liquid and a ditch to collect the concentrated liquid after evaporation, provided that the surface of the field was made substantially leak-proof. Properly constructed tarred roofs of garages, factories, or other buildings could be used without alteration for some exposure fields, and it should be borne in mind that the concentrated solution may be stored for use during the hours of maximum requirements. The storage capacity required, as already stated, would be 3½ cubic feet for each horsepower hour.

The installation of such a plant as has been described will be relatively cheap as compared with the cost of previous sun heat plants, due to the fact that no glass covers or rotating reflectors or the like are necessary and that much smaller storage tanks can be used.

Previously two types of installations have been used in sun heat power plants. In the first of these types, a number of mirrors moved by clockwork or by thermal relays have been employed to reflect the radiant heat of the sun upon a small boiler adapted to generate steam at atmospheric pressure. A plant of this kind has shown itself able to compete with coal at $2.36 per ton if loaded all year. Since the average load factor in modern plants is about .32, coal will have to cost $7.37 before this type of sun heat plant will be competitive. In addition to this, the cooling water required is about 200 gallons per brake horsepower hour, which is over twice that of the coal plant, and in many localities this amount of cooling water would not be obtainable.

In the second type of previously used plants, glass covered shallow basins are used to heat the water, and the cost in this case is believed to be quite as high as that of the plant employing mirrors.

To obtain power from either of these plants at night, tanks of water heated to 212° F. have been used. Without considering any loss of heat by radiation, only 1 horsepower hour can be stored for each 30 cubic feet of tank capacity.

Besides the advantage of storing 1 horsepower hour of power for each 3½ cubic feet of fluid in the present case, another great advantage lies in the fact that only 8 gallons of boiler feed water per brake horsepower hour are required. In this connection, it may be stated that the average coal or oil burning plant requires about 90 gallons of water per brake horsepower hour.

Instead of employing calcium chloride and calcium nitrate as in the exemplary embodiment described, the following chemicals can be used: Ammonium nitrate, lead acetate, potassium acetate, potassium carbonate, potassium hydroxide, lithium chloride, magnesium chloride, sodium acetate, sodium hydroxide, sodium nitrate, or sodium phiosulphate. Generally speaking, the compounds which are available in this process comprise salts or hydroxides of the alkaline or alkaline earth metals. Some of those listed are very costly and some are quite corrosive, and the list by no means exhausts all of the possible compounds which could be used. Therefore, the terms "salts solution", "primary fluid", and "solution capable of absorbing the steam with the evolution of heat", when employed in the claims, will be understood to include the items in the above list and also any chemical compounds which are endothermic in absorbing steam or water vapor in solution and preferably endothermic when a strong solution is diluted with water.

It will be understood that various changes and modifications may be made in the process and apparatus illustrated and described herein without departing from the scope of the invention as defined in the following claims.

Having thus described the invention, what is claimed as new and desired to be secured by Letters Patent is:

1. In a cyclic process for generating power, the steps of commingling a stream of low pressure steam and a stream of primary fluid comprising a concentrated solution capable of absorbing the steam with the evolution of heat, utilizing the latent heat of the steam and the heat of absorption by passing a separated body of secondary fluid in heat exchange relation with the commingling streams of primary fluid and low pressure steam, generating high pressure steam from the greater portion thereof, preheating said stream of primary fluid by passing it in heat exchange relation with the stream of spent primary fluid, and preheating said stream of secondary fluid by passing it in heat exchange relation with the residues from the generation of said high pressure steam.

2. In a process of the class described, the method of starting the operation which comprises the steps of passing a stream of concentrated primary fluid and a stream of water through a heat exchanger and then commingling said streams, thus producing heat by dilution, passing the commingled streams through said heat exchanger whereby the streams of primary fluid and water are preheated, and continuing this heat generating and heat exchanging process until the temperature of the commingled streams is high enough to generate steam for the further pursuance of the process.

3. In a cyclic process for generating power, the steps of commingling a stream of low pressure steam and a stream of primary fluid comprising a concentrated solution capable of absorbing the steam with the evolution of heat, utilizing the latent heat of the steam and the heat of absorption by passing a separated body of secondary fluid in heat exchange relation with the commingling streams of primary fluid and low pressure steam, generating high pressure steam from the greater portion thereof, and preheating said stream of secondary fluid by passing it in heat exchange relation with the residues from the generation of said high pressure steam.

4. In a cyclic process for generating power, the steps of commingling a stream of low pressure steam and a stream of primary fluid comprising a concentrated solution capable of absorbing the steam with the evolution of heat, utilizing the latent heat of the steam and the heat of absorption by passing a separated body of secondary fluid in heat exchange relation with the commingling streams of primary fluid and low pressure steam, generating high pressure steam from the greater portion thereof, passing said stream of primary fluid, said stream of secondary fluid, the stream of spent primary fluid, and the residues from the generation of said high pressure steam all in heat exchange relation with each other.

5. In a power plant of the class described, in combination, a heat generating and exchanging unit comprising a chamber, means normally employed for introducing water vapor into said chamber, means for introducing into said chamber a body of fluid capable of evolving heat upon dilution thereof, means for normally passing a separated body of fluid through said unit in heat exchange relation with said first named fluid during dilution thereof, means for by-passing said secondary fluid in starting the operation of the power plant into said chamber in lieu of said water vapor, and a heat exchanging device having connections with said chamber whereby said secondary body of fluid and said primary body of fluid may be brought into heat exchange relation with the spent dilute primary fluid in order to gradually increase the operating temperature of the plant until the water vapor can be introduced, and control valves for alternatively admitting water vapor or a secondary fluid to said chamber.

ALEXANDER T. KASLEY.